United States Patent [19]

Kerfoot et al.

[11] Patent Number: 5,348,713

[45] Date of Patent: Sep. 20, 1994

[54] RECOVERY OF METAL VALUES FROM ZINC PLANT RESIDUES

[75] Inventors: Derek E. Kerfoot, St. Albert; Michael J. Collins, Fort Saskatchewan; Michael E. Chalkley, St. Albert, all of Canada

[73] Assignee: Sherritt Gordon Limited, Edmonton, Canada

[21] Appl. No.: 929,927

[22] Filed: Aug. 14, 1992

[30] Foreign Application Priority Data

Dec. 15, 1989 [GB] United Kingdom ................ 8928368

[51] Int. Cl.$^5$ .......................... C22B 7/00; C22B 3/08; C22B 19/30
[52] U.S. Cl. ........................................ 423/26; 423/27; 423/36; 423/37; 423/95; 423/101; 423/106; 423/108; 423/109; 423/141; 423/146
[58] Field of Search ........................ 423/26, 27, 36, 37, 423/95, 108, 101, 106, 109, 141, 146

[56] References Cited

U.S. PATENT DOCUMENTS

| | | | |
|---|---|---|---|
| 3,510,414 | 5/1970 | Orlandini et al. | 204/119 |
| 3,652,264 | 3/1972 | Bodson | 204/119 |
| 3,691,038 | 9/1972 | Roepenack et al. | 204/119 |
| 3,976,743 | 8/1976 | Landucci et al. | 423/101 |
| 4,149,945 | 4/1979 | Kust | 423/36 |
| 4,545,963 | 10/1985 | Weir et al. | 423/26 |
| 4,572,822 | 2/1986 | Abe et al. | 423/37 |
| 4,676,828 | 6/1987 | Andre | 75/101 |
| 4,778,520 | 10/1988 | Spink et al. | 75/120 |

FOREIGN PATENT DOCUMENTS 0010365 4/1980 European Pat. Off.
0263539 4/1989 European Pat. Off.

OTHER PUBLICATIONS

*International Journal of Mineral Processing*, 20 (1987) 73-85, Elsevier Science Publishers B.V., Amsterdam, Netherlands, pp. 73-85, M. C. Fuerstenau et al., "The Surface Characteristics and Flotation Behavior of Anglesite and Cerussite".

J. M. Boxall and S. E. James, National Zinc Company, Bartlesville, Oklahoma 74003, USA, "Experience with the Goethite process at National Zinc", pp. 676-686 (1987).

*Primary Examiner*—Emily Bernhardt
*Assistant Examiner*—Matthew V. Grumbling
*Attorney, Agent, or Firm*—Stevens, Davis, Miller & Mosher

[57] ABSTRACT

A process is disclosed for recovering zinc, lead, copper and precious metals from zinc plant residue, said process comprising leaching the residue with return zinc spent electrolyte, neutralizing residual acid and reducing ferric iron in the solution by addition of zinc sulphide concentrate in the presence of a limited quantity of oxygen, flotation of the resulting slurry to separate unreacted zinc sulphide, treatment of flotation tailings with sulphur dioxide and elemental sulphur to further leach iron, zinc and impurity elements and precipitate copper, flotation of the resulting slurry to separate a copper sulphide concentrate, thickening, filtering and washing of the flotation tailings followed by addition of lime and sodium sulphide to activate lead sulphate and flotation of a lead concentrate from the residue. Iron and impurity elements are precipitated from the copper flotation tailings thickener overflow solution by addition of zinc hydroxide sludge, lime and oxygen to produce a high strength, iron free zinc sulphate solution.

9 Claims, 1 Drawing Sheet

RECOVERY OF METAL VALUES FROM ZINC PLANT RESIDUES

CROSS-REFERENCE TO RELATED APPLICATIONS

This application is a continuation of International Application No. PCT/CA90/00442 filed Dec. 14, 1990.

FIELD OF THE INVENTION

This invention relates to the recovery of metal values from zinc plant residues and, more particularly, relates to the separation of zinc, lead, copper and precious metal values from zinc plant residues in a form amenable to the recovery of these metal values.

BACKGROUND OF THE INVENTION

Residues produced in the treatment of zinc concentrates by conventional roast-leach-electrowinning processes may contain significant quantities of zinc, but the recovery of this zinc may be hampered by the presence of interfering elements such as iron or undesirable impurities such as arsenic, germanium or fluoride. It has been well known for many years that treatment of zinc ferrite residues in a hot acid leach will solubilize the zinc. However, treatment of these residues to recover the contained zinc was not economic until the 1960's when the jarosite and goethite processes were developed for handling the iron dissolved from the ferrite residues. In certain plants, the implementation of these processes has allowed for treatment of stockpiled residues which are fed to the hot acid leach at a slow rate along with current material. Not all zinc process residues are amenable to such a treatment, however, owing to the nature of the zinc species in the residue, which may be refractory to the hot acid leach process, or to the presence of other elements, which either interfere with the recovery of zinc or must be recovered in addition to the zinc. For example, the zinc plant residue may contain significant quantities of metal values other than zinc, such as lead, copper or precious metals, but the low grade of the residue in respect of these elements may preclude their economic recovery on an individual basis.

U.S. Pat. No. 4,572,822 issued Feb. 25, 1986 to Abe and Tanaka discloses a process for recovering copper from industrial residues involving a reducing leach of the residue in sulphur dioxide atmosphere to dissolve oxidic copper compounds and the addition of elemental sulphur to precipitate copper from the solution as copper sulphide. Although this process allows for the recovery of copper found in the industrial residue in both sulphidic and oxidic forms as a single copper sulphide product, the process does not allow for the presence of zinc as zinc sulphide in the industrial residue. Zinc sulphide, if present, would report along with the copper sulphide in a subsequent step to separate the copper sulphide from the industrial residue and would render the copper sulphide product of little or no value if the zinc sulphide were present in an amount equal to or greater than the amount of the copper sulphide.

In accordance with the process of the present invention, copper sulphide product from an industrial residue is recoverable substantially free of zinc.

U.S. Pat. No. 4,676,828 issued Jun. 30, 1987 to Andre discloses a process for the extraction of zinc from zinc sulphide concentrate including leaching with a dilute aqueous solution of sulphuric acid under atmospheric pressure. This process, however, relates to the extraction of zinc and copper from sulphurous zinciferous materials, and does not permit the separation and recovery of copper and zinc from industrial residues which contain a large proportion of oxidic compounds.

The flotation of lead sulphate and the precipitation of iron from a zinc sulphate solution are discussed in Papers by Fuerstenau et al. "The Surface Characteristics and Flotation Behavior of Anglesite and Cerussite", Int. J. of Min. Proc., 1987, 20, 73–85; Andre and Masson, "The Goethite Process in Retreating Zinc Leaching Residues", presented at the 102nd AIME Annual Meeting, 1973, Chicago; Boxall and James, "Experience with the Goethite Process at National Zinc"; and in J. E. Dutrizac and A. J. Monhemius (Ed.), Iron Control in Hydrometallurgy, 1986, Ellis Horwood, Chichester, 676–686.

None of these Papers discloses or suggests the combination of steps and parameters of the process of the present invention for the recovery of metal values from industrial residues. The process of the invention permits separation of zinc, copper, lead and precious metals from zinc plant residues in a readily recoverable form and surprisingly allows for recovery of metal values present in the head material in two or more substantially different mineral forms. Zinc or copper, for example, may be recovered in high yields whether they are present as sulphidic or oxidic compounds, or both.

SUMMARY OF THE INVENTION

In accordance with the process of the present invention, zinc plant residue is treated in both hot acid leaching and reducing leaching stages, with a neutralization and reduction stage and a flotation stage between the two leaching stages. Copper sulphide in the residue is first reacted with ferric iron in solution in the hot acid leach stage to oxidize the copper sulphide and to bring the copper content of this sulphide into the solution. Zinc sulphide in the residue is then recovered by flotation separation prior to leaching the remaining oxidic copper compounds and precipitating copper from the solution in the reducing leach stage with sulphur dioxide and elemental sulphur. The copper sulphide product that is recovered is substantially free of zinc. As a result of this combination of steps, both copper and zinc may be present in oxidic and sulphidic forms in the feed to the process and be recovered separately to high grade concentrates or to a high strength solution.

More particularly, the process of the invention relates to the recovery of zinc, lead, copper and precious metals from zinc plant residue containing ferrites comprising the steps of leaching said zinc plant residues with return spent electrolyte containing $H_2SO_4$ in an amount effective to dissolve the ferrites and to maintain at least 50 g/L $H_2SO_4$ in a hot acid leach at a temperature in the range of 70° to 100° C. and at atmospheric pressure to partially dissolve zinc, copper, iron and impurity elements and to essentially leach sulphide copper; treating the resulting leach slurry with zinc concentrate under oxidizing conditions at atmospheric pressure at a temperature in the range of 70° to 100° C. to consume excess acid from said hot acid leach and to increase the concentration of zinc in the leach solution and continuing said treatment with zinc concentrate under reducing conditions to reduce ferric iron in solution to ferrous iron; recovering excess zinc concentrate and elemental sulphur produced in the reaction of zinc concentrate with acid and ferric iron by zinc flotation as a flotation concentrate; subjecting zinc flotation tailings to a reducing leach in the presence of gaseous sulphur dioxide and elemental sulphur at a temperature in the range of 70° to 120° C. with a sulphur dioxide overpressure of at least 30 kPa to extract zinc, copper, iron and impurity elements, to reprecipitate copper as copper sulphide, and to convert lead in jarosite to lead sulphate; recovering copper sulphide by copper flotation as a flotation concentrate; subjecting the copper flotation tailings to a liquid-solid separation; recovering lead sulphate as a flotation concentrate by lead flotation of the separated solids from the liquid-solid separation of the copper flotation tailings; and recovering and treating the reducing leach solution from the liquid-solid separation for the recovery of contained zinc values.

The process preferably includes adjusting the pH of the reducing leach solution from the liquid-solid separation to about 3.5 to 4.0 and oxidizing the largest part of contained ferrous iron to ferric iron in an oxidizing atmosphere at a temperature in the range of 70° to 100° C., preferably about 85° C., at atmospheric pressure for precipitation of iron as ferric hydroxide or hydrated ferric oxide with impurity elements, and separating the residual solution: and adjusting the pH of the recovered residual solution to about 5.0, oxidizing the contained iron to ferric iron in an oxidizing atmosphere at a temperature in the range of 70° to 100° C., preferably about 85° C., at atmospheric pressure for precipitation of iron as ferric hydroxide or hydrated ferric oxide, and separating the residual solution for recovery of contained zinc values.

BRIEF DESCRIPTION OF THE DRAWING

The accompanying figure is a flow diagram of the recovery process of the invention which is further described below.

DESCRIPTION OF THE PREFERRED EMBODIMENT

Figure 1:
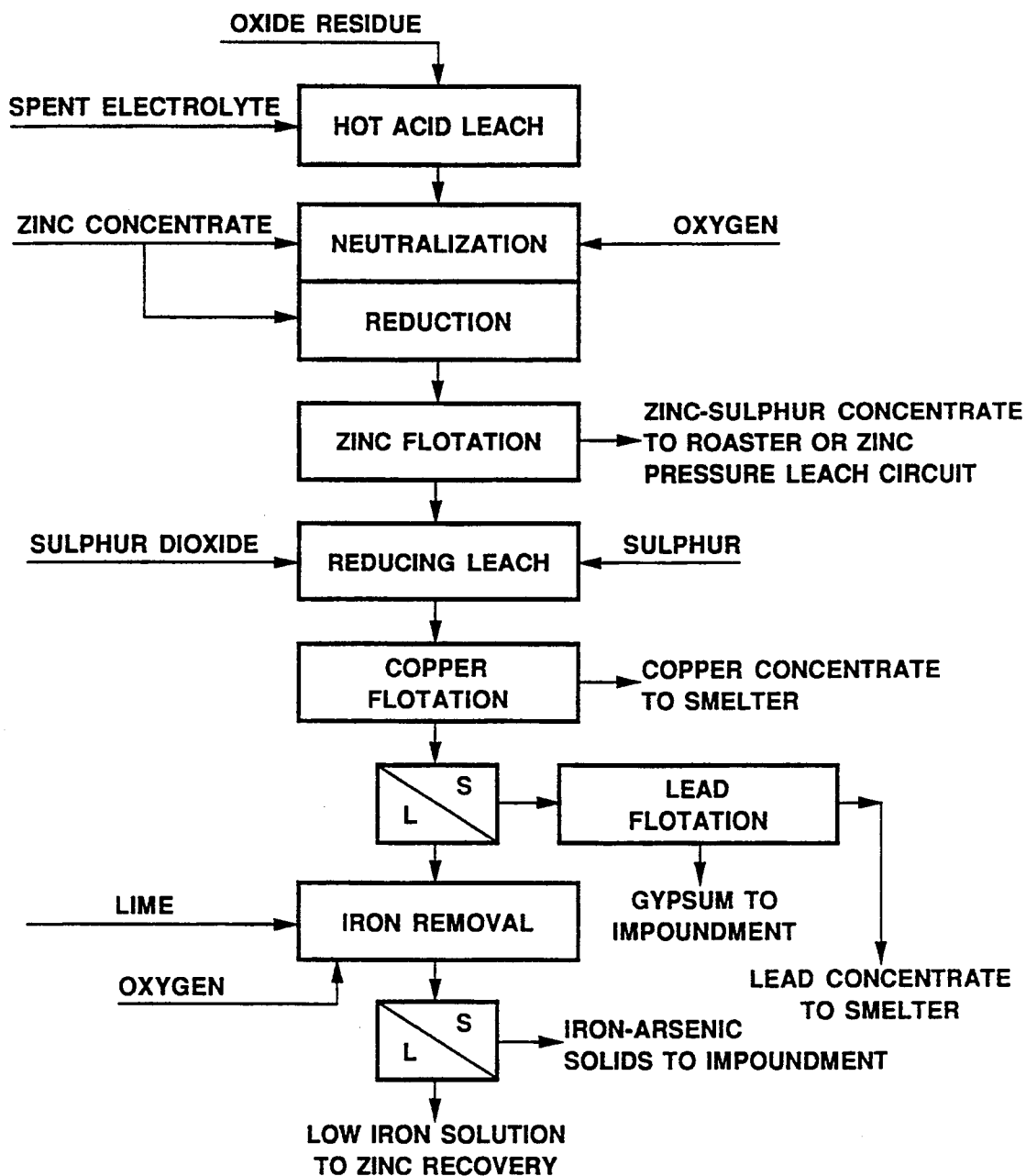

Zinc plant residue containing zinc, lead, copper and precious metal values is contacted with return zinc spent electrolyte at atmospheric pressure and a temperature of at least 70° C., preferably in the range of 70° to 100° C., and more preferably, 85° to 95° C. to partially dissolve zinc, copper, iron and impurity elements. It is of particular importance to the recovery of copper that sulphide copper in the zinc plant residue is leached in this step. The resulting slurry is treated with zinc concentrate under oxygen sparging conditions at atmospheric pressure and a temperature of at least 70° C. or more preferably 85° to 95° C., to consume the excess of acid from the previous step and to increase the concentration of zinc in the solution. Additional zinc concentrate is fed to the slurry in the absence of oxygen, but at otherwise similar temperature and pressure, to reduce ferric iron in solution to the ferrous state. Excess zinc concentrate and elemental sulphur produced in the reaction of zinc concentrate with acid and ferric iron is recovered by flotation, this flotation concentrate being suitable as feed to a zinc pressure leach autoclave or a roaster.

The flotation tailings is treated with sulphur dioxide and elemental sulphur at a temperature of at least 70° C. preferably in the range of 70° to 120° C., and more preferably in the range 90° to 100° C. and with an overpressure of sulphur dioxide of at least 30 kPa, preferably at about 100 kPa, to further extract zinc, copper, iron and impurity elements, to reprecipitate copper as copper sulphide, and to convert lead in jarosite to lead sulphate. The slurry resulting from this reducing leach is subjected to a second flotation step to separate a copper sulphide concentrate, this flotation concentrate being suitable as feed to a copper smelter. After liquid-solid separation and adjustment to between pH 8.5 and pH 10.0, more preferably pH 9.5, the flotation tailings solids are sulphidized for recovery of a lead sulphate flotation concentrate, which is suitable as feed to a lead smelter. The lead flotation tailings, comprised of gypsum and other gangue minerals, is stockpiled.

The leach solution separated from the copper flotation tailings solids, containing the largest part of the zinc in the head material, is treated with lime or zinc hydroxide sludge in a two stage process for precipitation of iron and impurity elements from the solution. Both stages are maintained at a temperature between 70° and 100° C., more preferably at 85° C. The solution is maintained at about pH 4 or less in the first stage to limit the coprecipitation of zinc. After liquid-solid separation, the iron cake is impounded and the solution sent to a second stage of iron removal at pH 5. The resulting slurry is clarified and the solids recycled to the first stage of the iron removal step for recovery of precipitated zinc. Zinc may be recovered from the low iron zinc sulphate solution using conventional purification and electrowinning techniques, or the solution may be integrated with the existing zinc plant. Precious metal values in the oxide residue head material are distributed among the three flotation concentrates in the process, where they may be recovered along with the contained zinc, copper, or lead values.

Zinc ferrite is a common component in zinc plant residues and this mineral is partially dissolved in spent electrolyte returned from zinc electrowinning in the first step of the present process, as outlined in reaction 1). Additional sulphuric acid may be required to maintain a solution concentration of 50 g/L $H_2SO_4$ or greater. This hot acid leach step is conveniently carried out in a series of agitated tanks at atmospheric pressure and at a temperature of about 90° C.

$$ZnFe_2O_4 + 4H_2SO_4 \rightarrow ZnSO_4 + Fe_2(SO_4)_3 + 4H_2O \qquad 1)$$

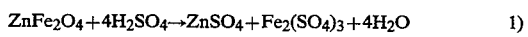

Ferric iron extracted into the hot acid leach solution is effective at leaching sulphide minerals present in the plant residue, and especially covellite, CuS. It is important that copper sulphide is leached in this step of the process so as not to report to the zinc flotation concentrate. The reaction of ferric iron with covellite is given below.

$$Fe_2(SO_4)_3 + CuS \rightarrow 2FeSO_4 + CuSO_4 + S^0 \qquad 2)$$

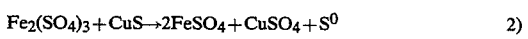

To ensure rapid leaching kinetics, the acid level in the hot acid leach solution is maintained at 50 g/L $H_2SO_4$ or greater. Acid in the hot acid leach discharge is partially neutralized in the next step with zinc sulphide concentrate to decrease reagent costs in the iron removal step and to increase the concentration of zinc in the solution. Ferric iron in the hot acid leach solution reacts with zinc sulphide and extracts zinc into the solution in a similar fashion to the reaction with covellite in the previous step. Oxygen is sparged into the reaction vessel so as to regenerate ferric iron and continue the reaction. The net result is a decrease in the acid concentration and an increase in the zinc concentration of the solution.

The equations for the reaction of zinc concentrate with ferric iron and oxygen are given below.

$$ZnS + Fe_2(SO_4)_3 \rightarrow ZnSO_4 + 2FeSO_4 + S^0 \quad (3)$$

$$2FeSO_4 + H_2SO_4 + 1/2 O_2 \rightarrow Fe_2(SO_4)_3 + H_2O \quad (4)$$

$$ZnS + H_2SO_4 + 1/2 O_2 \rightarrow ZnSO_4 + S^0 + H_2O \quad (5)$$

After the acid concentration of the solution has been decreased to between about 10 to 20 g/L $H_2SO_4$, it is desirable to reduce the majority of the iron in solution to the ferrous state so as to keep iron in solution and to minimize the consumption of sulphur dioxide in the reducing leach step. Reduction of ferric iron in the neutralization-reduction solution is accomplished by adding a portion of the zinc sulphide concentrate in the absence of oxygen (reaction 3). The neutralization-reduction step may be conveniently carried out at atmospheric pressure and at 85° C. in a series of stirred tanks, with oxygen added to all but the last tank.

It is important that the conditions in the neutralization-reduction step be maintained sufficiently oxidizing that copper in the solution is not precipitated by metathesis with zinc sulphide, as given in the reaction 6) below. Copper precipitated in this manner would report to the zinc flotation concentrate in the following step of the process, rather than to the copper flotation concentrate. A concentration of between 1 and 5 g/L ferric iron in the neutralization-reduction solution is sufficient to prevent precipitation of copper in this step.

$$CuSO_4 + ZnS \rightarrow CuS + ZnSO_4 \quad (6)$$

Neutralization-reduction slurry is subjected to flotation for recovery of a zinc sulphide concentrate. The flotation concentrate contains unreacted zinc sulphide added during neutralization-reduction, zinc sulphide contained in the original zinc plant residue, and elemental sulphur produced as in leaching reactions 2) and 3). No flotation reagents are required since the elemental sulphur formed by reaction of zinc sulphide in the previous steps tends to remain on the surface of the zinc sulphide particles and assists in their flotation. The grade of the zinc flotation concentrate will depend primarily upon the quantity of excess zinc sulphide added during neutralization-reduction. The principal diluent is elemental sulphur produced by reaction of sulphides with ferric iron. The zinc flotation concentrate is suitable as feed to a roaster or to a zinc pressure leach plant. The sulphur content of the concentrate may be conveniently recovered as elemental sulphur if the concentrate is treated in a zinc pressure leach plant.

Zinc flotation tailings slurry is the feed to a reducing leach step, where it is treated at about 100° C. under an atmosphere of sulphur dioxide. Zinc, copper, iron and impurity elements in the zinc flotation tailings solids are largely extracted in this step, and lead found as plumbojarosite is converted to lead sulphate. Elemental sulphur is added to precipitate copper from solution as copper sulphide. Iron in solution is also reduced to the ferrous state, allowing for a high solution concentration of iron at the low acid level (about 5 g/L $H_2SO_4$). This ensures a minimum of iron contamination of the zinc, copper and lead product streams. Appropriate reactions for the reducing leach are summarized below:

$$ZnFe_2O_4 + SO_2 + 2H_2SO_4 \rightarrow ZnSO_4 + 2FeSO_4 + 2H_2O \quad (7)$$

$$CuSO_4 + S^0 + SO_2 + 2H_2O \rightarrow CuS + 2H_2SO_4 \quad (8)$$

$$PbFe_6(SO_4)_4(OH)_{12} + 3SO_2 \rightarrow PbSO_4 + 6FeSO_4 = 6 H_2O \quad (9)$$

$$Fe_2(SO_4)_3 + SO_2 + 2H_2O \rightarrow 2FeSO_4 + 2H_2SO_4 \quad (10)$$

The reducing leach slurry is treated in a second flotation operation to separate and recover a high grade copper sulphide concentrate, which is suitable as feed to a copper smelter. The reducing leach solution, containing the largest part of the zinc in the original zinc plant residue, is then separated from the flotation tailingssolids, which contains the bulk of the lead.

The copper flotation tailings solids are subjected to another flotation operation to separate lead sulphate from the gangue minerals. The flotation of lead sulphate may be facilitated by adjustment of the pulp to a pH between pH 8.5 and pH 10, preferably about pH 9.5, by addition of lime, followed by addition of a sulphidizing agent such as sodium sulphide or calcium hydrosulphide, and a suitable collector such as potassium amyl xanthate. Gypsum and other gangue minerals report to the flotation tailings, which is stockpiled.

The reducing leach solution contains iron and impurity elements which must be separated from zinc in the solution. Iron may be conveniently precipitated from the solution in a two stage process at about 85° C., and at atmospheric pressure. It is important for the settling and filtration characteristics of this precipitate that iron in the feed solution is in the ferrous state. The pH of the solution is adjusted to between 3.5 and 4.0 in the first stage of the iron removal process. Limestone, lime, zinc calcine, basic zinc sulphate or zinc hydroxide sludge may be used for initial pH adjustment and for neutralizing the acid produced upon hydrolysis of iron. Air or oxygen is added to oxidize iron to the ferric state. Ferric iron is rapidly hydrolyzed and precipitates from solution as ferric hydroxide. Impurity elements such as arsenic, germanium and fluoride are coprecipitated from solution with the iron. After liquid-solid separation, the solids, containing about 20% by weight iron, are stockpiled.

The first stage iron removal solution, containing between about 0.1 and 1.0 g/L iron, is treated with additional neutralizing agent such as lime or zinc hydroxide sludge to raise the pH to about 5.0. The bulk of the remainder of the iron is precipitated in the presence of oxygen or air. After clarification, this second stage iron removal solution may be treated by conventional purification and electrowinning techniques for recovery of the contained zinc, or it may be integrated with the existing zinc plant. The second stage iron removal solids are recycled to the first stage of iron removal to recover zinc precipitated at the higher pH range.

Precious metals values are distributed between the three flotation concentrates. Since copper and lead smelters and zinc pressure leach plants are typically designed for concentration or recovery of precious metals, the silver and gold values in the original zinc plant residue may also be in large part recovered.

The process of the invention will now be described with reference to the following non-limitive examples. The first example describes results for treatment of a zinc plant residue directly in a reducing leach step, according to the process outlined in U.S. Pat. No. 4,572,822. The second example details results for treatment of the same residue under the conditions of the present invention.

EXAMPLE 1

A residue containing 6.4% Ca. 1.6% Cu, 14.5% Fe, 13.7% Pb, 0.016% Ag, 7.5% S as sulphate, 9.0% total sulphur and 11.5% Zn (dry basis) was obtained from the stockpile at an operating zinc plant. Mineralogical analysis of the material demonstrated that calcium was found primarily as gypsum, copper as copper sulphides, iron as zinc ferrite and jarosite, lead as lead sulphate and jarosite, and zinc as zinc ferrite, zinc sulphide and zinc silicate. The residue, obtained as a cake containing 46% by weight moisture, was leached in sulphuric acid solution in a 4 L autoclave at 100° C. with an overpressure of 275 kPa sulphur dioxide and with addition of 10 g elemental sulphur per kg of residue (dry basis). The molar ratio of sulphuric acid to zinc in the residue was 1.7:1. The results for a retention time of four hours (batch) are given in the table below.

| Solution Analysis, g/L | | | | Extraction, % | | |
|---|---|---|---|---|---|---|
| Cu | Fe | $H_2SO_4$ | Zn | Cu | Fe | Zn |
| <0.01 | 31.3 | 22.5 | 22.4 | <1 | 94 | 79 |

Reducing leach residue was subjected to flotation to recover copper as copper sulphide. The Dow reagent 7200 was added at a rate of 200 g/t solids to assist the flotation. The results are given in the table below.

| Fraction | Analysis, % | | | Distributions, % | | |
|---|---|---|---|---|---|---|
| | Cu | Pb | Zn | Cu | Pb | Zn |
| Feed | 2.3 | 15.1 | 5.1 | 100 | 100 | 100 |
| Cleaner Concentrate | 19.8 | 4.7 | 28.8 | 79 | 3 | 52 |
| Scavenger Tailings | 0.5 | 16.2 | 2.7 | 21 | 97 | 48 |

None of the products obtained in the test sequence was of sufficient quality to allow for facile recovery of the contained metals. Although 79% extraction of zinc was achieved in the reducing leach, the leach solution was dilute, containing 22.4 g/L Zn. Although a large fraction of the copper in the zinc plant residue was converted to copper sulphide in the reducing leach, the copper concentrate recovered by flotation of the reducing leach residue was also of low grade, containing 19.8% Cu. Zinc sulphide was a major diluent, with zinc representing 28.8% of the weight of the flotation concentrate. Similarly, although 97% of the lead was recovered to the flotation tailings, this tailings was also of very low grade, containing 16.2% by weight lead.

EXAMPLE 2

The stockpiled zinc plant residue described in Example 1, recovered as a filter cake containing 46% by weight moisture, was repulped in spent electrolyte and heated to 90° C. in a train of four continuous stirred tank reactors arranged in cascade. The results for a total retention time of 12 h and a spent addition rate of 3 m³ per tonne of stockpiled residue (dry basis) are summarized in the table below. Although the total retention time was 12 h, reaction was essentially complete by the third tank in the train, representing a retention time of 9 h. Zinc extraction was limited to 34% in this step owing to the presence of zinc sulphide, zinc silicate and other zinc compounds refractory to the hot acid leach.

| Solution Analysis, g/L | | | | Extraction, % | | |
|---|---|---|---|---|---|---|
| Cu | Fe | $H_2SO_4$ | Zn | Cu | Fe | Zn |
| 3.2 | 18.9 | 48.4 | 68.6 | 69 | 46 | 34 |

Slurry from the hot acid leach step described above was contacted with zinc sulphide concentrate in a train of five agitated tanks arranged in cascade. Oxygen was sparged into the first four tanks of the train. The results for addition of 390 kg of zinc concentrate per tonne of stockpiled residue (dry basis) with a total retention time of 6 h at 90° C. are summarized in the table below.

| Solution Analysis, g/L | | | | |
|---|---|---|---|---|
| Cu | $Fe^{2+}$ | Fe | $H_2SO_4$ | Zn |
| 3.4 | 14.9 | 21.4 | 18.4 | 84.6 |

Slurry from the neutralization-reduction step described above was subjected directly to flotation, without the aid of reagents. Results for the flotation are summarized in the table below.

| Fraction | Analysis, % | | | Distributions, % | | |
|---|---|---|---|---|---|---|
| | Cu | Pb | Zn | Cu | Pb | Zn |
| Feed | 0.7 | 13.3 | 16.4 | 100 | 100 | 100 |
| Cleaner Concentrate | 0.9 | 1.2 | 44.0 | 47.5 | 1.7 | 73.7 |
| Scavenger Tailings | 0.6 | 16.1 | 5.9 | 52.5 | 98.3 | 26.3 |

Although the zinc flotation concentrate contained nearly 1% Cu by weight, the quantity of copper in this fraction was less than that in the concentrate added to the neutralization-reduction step, and the zinc flotation concentrate did not represent an outlet for copper contained in the zinc plant residue.

Zinc flotation tailings slurry was treated at 100° C., under 100 kPa sulphur dioxide overpressure in the reducing leach step. Elemental sulphur was added as a fine powder to the feed slurry at a rate of between 5 and 10 kg per ton of stockpiled residue. The results for a retention time of 4 h are given in the table below. The extraction values quoted are based on the reducing leach residue analyses. They are cumulative for the leaching steps, and metal fractions reporting to the zinc flotation concentrate are also included in the net "extraction".

| Solids Analysis, % | | | | Extraction, % | | |
|---|---|---|---|---|---|---|
| Cu | Fe | Pb | Zn | Cu | Fe | Zn |
| 2.8 | 2.3 | 21.1 | 1.8 | <1 | 89.7 | 89.8 |

Copper sulphide precipitated in the reducing leach was recovered by flotation of the reducing leach residue. The Dow reagent 7200* was added at a rate of 200 g/t solids to assist the flotation. The results are given in the table which follows:
* Trademark

| Fraction | Analysis, % | | | Distributions, % | | |
|---|---|---|---|---|---|---|
| | Cu | Pb | Zn | Cu | Pb | Zn |
| Feed | 2.8 | 21.1 | 1.8 | 100 | 100 | 100 |
| Cleaner Concentrate | 49.0 | 0.2 | 1.1 | 86.4 | 0.1 | 3.0 |
| Scavenger Tailings | 0.4 | 21.5 | 1.8 | 13.6 | 99.9 | 97.0 |

Copper flotation tailings was thickened and the underflow filtered, washed and repulped with water to 12% solids by weight in preparation for the lead flotation step. Slaked lime slurry was added to adjust the solution to pH 9 or greater, followed by sodium sulphide to activate lead sulphate, and potassium amyl xanthate as the collector. The results for addition of 65 kg/t lime (pH 9.8), 660 g/t sodium sulphide and 800 g/t potassium amyl xanthate, with 3 minutes conditioning time between additions of reagents, are summarized in the table below. All reagent addition rates are based on the weight of copper flotation tailings solids.

| Fraction | Analysis, % | | | | Distributions, % | | | |
| --- | --- | --- | --- | --- | --- | --- | --- | --- |
| | Ca | Cu | Pb | Zn | Ca | Cu | Pb | Zn |
| Feed | 13.7 | 0.5 | 22.5 | 1.7 | 100 | 100 | 100 | 100 |
| Cleaner Concentrate | 0.4 | 1.1 | 52.9 | 3.2 | 1.2 | 90.0 | 94.4 | 75.6 |
| Scavenger Tailings | 22.7 | 0.1 | 2.1 | 0.5 | 98.8 | 10.0 | 5.6 | 24.4 |

Acidic zinc sulphate solution separated from the copper flotation tailings solids was neutralized with zinc hydroxide sludge, obtained by treatment of wash solutions with lime, under oxygen sparging conditions at 85° C. in two stages of atmospheric iron removal. Sufficient sludge was added in the first stage to maintain the solution at pH 3.5. The first stage slurry was filtered and the solution treated in the second stage at pH 5 by addition of lime slurry. The retention times in these batch tests were 4 h in the first stage and 2 h in the second stage. The results are given in the table below. Iron in the feed solution to the iron removal step was virtually all in the ferrous state.

| | Solution Analysis, g/L | | | | Solids Analysis, % | | |
| --- | --- | --- | --- | --- | --- | --- | --- |
| | As | Fe | $H_2SO_4$ | Zn | Ca | Fe | Zn |
| Head | 2.19 | 38.2 | 7.5 | 82 | — | — | — |
| First Stage | <0.02 | 0.1 | pH 3.6 | 104 | 15.3 | 22.5 | 1.1 |
| Second Stage | <0.001 | <0.0005 | pH 5.1 | 114 | — | 9.9 | 48.4 |

Overall recoveries of copper, lead, silver and zinc in the stockpiled residue to the products described Example 2 are summarized in the table below:

TABLE

| Product | Distribution, % | | | |
| --- | --- | --- | --- | --- |
| | Cu | Pb | Ag | Zn |
| Zinc Flotation Concentrate | — | 2 | 74 | 16 |
| Copper Flotation Concentrate | 86 | <1 | 11 | <1 |
| Lead Flotation Concentrate | 12 | 93 | 10 | 8 |
| Low iron Zinc Sulphate Solution | <1 | — | — | 70 |
| Lead Flotation Tailings (Gypsum Residue) | 1 | 5 | 5 | 2 |
| Iron Precipitate | <1 | — | — | 4 |

It will be understood that changes and modifications may be made in the embodiments of the invention without departing from the scope and purview of the appended claims

We claim:

1. A process for the recovery of zinc, lead, copper and precious metals from zinc plant residues containing ferrites comprising the steps of:

leaching said zinc plant residues with an aqueous acid solution containing $H_2SO_4$ in an amount effective to dissolve the ferrites and to maintain at least 50 g/L $H_2SO_4$ in a hot acid leach at a temperature in the range of 70° to 100° C. and at atmospheric pressure to partially dissolve zinc, copper, iron and impurity elements and to essentially leach sulphide copper;

treating the resulting leach slurry with zinc concentrate under oxidizing conditions at atmospheric pressure at a temperature in the range of 70° to 100° C. to consume excess acid from said hot acid leach and to increase the concentration of zinc in the leach solution and continuing said treatment with zinc concentrate under reducing conditions to reduce ferric iron in solution to ferrous iron;

recovering excess zinc concentrate and elemental sulphur produced in the reaction of zinc concentrate with acid and ferric iron by zinc flotation as a flotation concentrate;

subjecting zinc flotation tailings to a reducing leach in the presence of gaseous sulphur dioxide and elemental sulphur at a temperature in the range of 70° to 120° C. with a sulphur dioxide overpressure of at least 30 kPa to extract zinc, copper, iron and impurity elements, to reprecipitate copper as copper sulphide, and to convert lead in jarosite to lead sulphate;

recovering copper sulphide by copper flotation as a flotation concentrate;

subjecting the copper flotation tailings to a liquid-solid separation;

recovering lead sulphate as a flotation concentrate by lead flotation of the separated solids from the liquid-solid separation of the copper flotation tailings; and recovering and treating the reducing leach solution from the liquid-solid separation for the recovery of contained zinc values.

2. In a process as claimed in claim 1, adjusting the pH of the reducing leach solution from the liquid-solid separation to about 3.5 to 4.0, and oxidizing the contained ferrous iron to ferric iron in an oxidizing atmosphere at a temperature of about 85° C. at atmospheric pressure for precipitation of iron as ferric hydroxide or hydrated ferric oxide with impurity elements, and separating the residual solution; and adjusting the pH of the recovered residual solution to about 5.0, oxidizing the contained iron to ferric iron in an oxidizing atmosphere at a temperature of about 85° C. at atmospheric pressure for precipitation of iron as ferric hydroxide or hydrated ferric oxide, and separating the residual solution for recovery of contained zinc values.

3. A process as claimed in claim 1 in which said zinc plant residues are leached in a hot acid leach at a temperature in the range of 85° to 95° C.

4. A process as claimed in claim 1 in which said zinc plant residues are leached in a hot acid leach at a temperature in the range of 85° to 95° C. and the leach slurry is treated with zinc concentrate at a temperature in the range of 85° to 95° C.

5. A process as claimed in claim 1 in which said zinc plant residues are leached in a hot acid leach at a temperature in the range of 85° to 95° C., leach slurry is treated with zinc concentrate at a temperature in the range of 85° to 95° C., and zinc flotation tailings are subjected to a reducing leach at a temperature at about 100° C. and at a sulphur dioxide overpressure of about 100 kPa.

6. A process as claimed in claim 1 in which said impurity elements are arsenic, germanium and fluoride.

7. A process as claimed in claim 2 in which the pH is adjusted by the addition of limestone, lime, zinc calcine, basic zinc sulphate or zinc hydroxide sludge.

8. A process as claimed in claim 1 in which the oxidizing conditions are provided by oxygen or air.

9. A process as claimed in claim 1 in which the aqueous acid solution is return spent electrolyte from zinc electrowinning.

* * * * *